United States Patent [19]

Suenaga

[11] Patent Number: 5,589,988
[45] Date of Patent: Dec. 31, 1996

[54] RETROFOCUS-TYPE WIDE ANGLE LENS SYSTEM HAVING A FIXED FRONT LENS GROUP AND A MOVABLE REAR LENS GROUP

[75] Inventor: Yutaka Suenaga, Yokohama, Japan

[73] Assignee: Nikon Corporation, Tokyo, Japan

[21] Appl. No.: 568,522

[22] Filed: Dec. 7, 1995

Related U.S. Application Data

[63] Continuation-in-part of Ser. No. 231,042, Apr. 22, 1994, abandoned.

[30] Foreign Application Priority Data

Apr. 26, 1993 [JP] Japan ................................. 5-099602

[51] Int. Cl.[6] ................................................. G02B 13/04
[52] U.S. Cl. ..................... 359/752; 359/749; 359/751; 359/755; 359/761
[58] Field of Search .................................. 359/749, 750, 359/751, 752, 753, 755, 761

[56] References Cited

U.S. PATENT DOCUMENTS

| | | | |
|---|---|---|---|
| 3,738,738 | 6/1973 | Takahashi | 359/749 |
| 3,829,198 | 8/1974 | Takahashi | 359/753 |
| 3,975,090 | 8/1976 | Lawson | 359/751 |
| 3,992,085 | 11/1976 | Momiyama | 359/708 |
| 3,999,840 | 12/1976 | Momiyama | 359/750 |
| 5,218,480 | 6/1993 | Moskovich | 359/753 |
| 5,321,554 | 6/1994 | Ishiyama et al. | 359/753 |

FOREIGN PATENT DOCUMENTS 5119254  5/1993  Japan ..................................... 359/751

*Primary Examiner*—David C. Nelms
*Assistant Examiner*—Andrew Q. Tran
*Attorney, Agent, or Firm*—Shapiro and Shapiro

[57] ABSTRACT

A wide angle lens system comprises a front lens group and a rear lens group having positive refractive power. The front lens group includes in the order from the object side, a negative meniscus lens component having a convex surface facing the object side, a cemented lens component having a negative lens element and a positive lens element and a convex cemented surface facing the object side. The rear lens group includes a cemented lens component having a positive lens element and a negative lens element and a convex surface facing the object side. The rear lens group is moved toward the object side for focusing operation from the infinite object distance to the shortest object distance.

18 Claims, 4 Drawing Sheets

RETROFOCUS-TYPE WIDE ANGLE LENS SYSTEM HAVING A FIXED FRONT LENS GROUP AND A MOVABLE REAR LENS GROUP

This is a continuation-in-part of application Ser. No. 08/231,042 filed Apr. 22, 1994, now abandoned.

BACKGROUND OF THE INVENTION

1. Field of the Invention

The present invention relates to a wide angle lens of retrofocus type, and more particularly to a wide angle lens with a large aperture, and a so called low F-number, adapted for use as a phototaking lens.

2. Related Background Art

The focusing of conventional phototaking lenses is generally achieved by moving the entire lens system toward the object side.

However, the wide angle lens of retrofocus type with a low F-number tends to involve a large number of constituting lens elements in order to attain satisfactory imaging performance, thus resulting in an increased weight of the entire lens system. The above-mentioned focusing method of moving the entire lens system inevitably requires a complicated mechanism for supporting the heavy entire lens system in movable state.

Also, recent phototaking lenses are often provided with an auto focusing mechanism, and the above-mentioned focusing method of moving the entire lens system also results in a drawback of increased load for the lens-driving motor.

Furthermore, such method of moving the entire lens system results in deterioration of imaging performance for an object at a short distance, particularly deficient correction for spherical aberration and/or significant outward coma, thus leading to a significantly lowered image contrast.

SUMMARY OF THE INVENTION

In consideration of the foregoing, an object of the present invention is to provide a wide angle lens, which, despite a low F-number, can maintain satisfactory imaging performance from short object distance to infinite object distance, with a simple lens configuration.

The above-mentioned object can be attained, according to an embodiment of the present invention, by a wide angle lens system comprising, a front lens group; and a rear lens group having positive refractive power;

said front lens group including, in the order from the object side, a negative meniscus lens component having a convex surface facing the object side, a cemented lens component having a negative lens element, a positive lens element and a convex cemented surface with positive refractive power facing the object side, said rear lens group including, a cemented lens component having a positive lens element, a negative lens element and a convex surface facing the object side, wherein the distance between said front and said rear lens groups decreases upon focusing operation from the infinite object distance toward the shortest object distance.

More particularly, in the focusing operation, the rear lens group is moved toward the object side from the infinite object distance to the shortest object distance.

In the present invention, as explained above, the entire lens system is divided into the front and rear lens groups, and the rear lens group alone, closer to the image plane, is moved for focusing to object a short distance. Since this lens configuration reduces the lens mass to be moved in the focusing operation, the moving mechanism for the entire lens system can be simplified, and the load to the lens-driving motor can be alleviated. Also, as the distance between the front and rear lens groups is decreased at the focusing to the short object distance, the rear focal length, which becomes larger as the object moves from the infinite distance to the shorter distance, can be maintained almost constant.

In the present invention, the negative meniscus lens component in the front lens group has a function of increasing the rear focal length of the entire lens system. Though this negative meniscus lens component generates spherical aberration, image plane curvature and distortion aberration, these can be corrected by the cemented surface of the cemented lens component in the front lens group, so that the configuration of the front lens group can be simplified.

Also, in the present invention, as the rear lens group is moved toward the object side for focusing to the short object distance, there may be generated a variation in the color aberration, by such movement of the rear lens group. In the present invention, however, since the rear lens group includes a cemented lens component consisting of a positive lens element and a negative lens element, the color aberration can be corrected within the rear lens group alone.

Consequently the present invention can provide a wide angle lens which, despite a low F-number, can maintain satisfactory imaging performance from the short object distance to the infinite object distance with a simple lens configuration.

In addition to the configuration mentioned above, the lens of the present invention is preferably so constructed as to satisfy the following condition (1):

$$0 \leq f/f_1 < 0.13 \tag{1}$$

wherein f: focal length of the entire lens system;

$f_1$: focal length of front lens group.

The above-mentioned condition (1) normalizes the focal length of the front lens group with that of the entire wide angle lens.

Above the upper limit of the condition (1), the refractive power of the front lens group becomes excessively large, and it becomes unable to secure the rear focal length for the entire lens system. Thus there are undesirably generated spherical aberration, image plane curvature and distortion aberration.

Also below the lower limit of the condition (1), the front lens group will have a negative refractive power. In this case it is possible to secure a sufficient rear focal length for the entire lens system, but it becomes unable to sufficiently correct positive spherical aberration, positive image plane curvature and negative distortion aberration, generated by the negative meniscus lens component. Also such negative refractive power of the front lens group is undesirable as the aberrations vary significantly in focusing to the short object distance by the movement of the rear lens group.

Also in the present invention, the cemented lens component in the front lens group is preferably constructed with a relatively large thickness. Such structure brings the entrance pupil closer to the object side and brings about an advantage that the lens system positioned at the object side of the diaphragm need not be increased in diameter even when the diaphragm is positioned closer to the image side. If the diaphragm is positioned closer to the image side, the lenses positioned at the image side of the diaphragm can be reduced in diameter, so that the entire lens system can be made compact.

In such case, the front lens group is preferably so constructed as to satisfy the following condition (2), defining the optimum thickness range of the cemented lens component:

$$0.1 < |f_F|/D < 4 \tag{2}$$

wherein $f_F$: synthesized focal length of lenses positioned at the object side of the cemented lens component in the front lens group;

D: thickness of the cemented lens component in the front lens group.

Above the upper limit of the condition (2), the cemented lens component becomes thinner, so that the rear focal length becomes too short. It is still possible to secure the rear focal length by shortening the focal length $f_F$ of the lens system positioned at the object side of the cemented lens component, but, in such case, the aberrations generated by said lens system positioned at the object side of the cemented lens component become undesirably large. On the other hand, below the lower limit of the condition (2), the cemented lens component becomes thicker, thus increasing the weight of the entire lens system and also resulting in difficulty in the manufacture of the cemented lens component itself.

In addition to the foregoing, the wide angle lens of the present invention is preferably so constructed as to satisfy the following condition (3):

$$0.1 < (r_B - r_A)/(r_B + r_A) < 1.0 \tag{3}$$

wherein $r_A$: radius of curvature of the lens surface closest to the object side of the cemented lens component in the rear lens group;

$r_B$: radius of curvature of the lens surface closest to the image side of the cemented lens component in the rear lens group.

This condition (3) defines the shape of the entire cemented lens component in the rear lens group. Above the upper limit of the condition (3), there is generated large negative spherical aberration, so that the aberrations become unbalanced, and the rear focal length becomes too short.

The cemented lens component in the rear lens group is, as a whole, a meniscus shape having a convex surface facing the object side.

The cemented lens component also serves to correct the Petzval's sum in cooperation with the lenses positioned at the image side of the cemented lens component, and, below the lower limit of the condition (3), the correction of the Petzval's sum becomes insufficient.

Also in the present invention it is desirable to divide the rear lens group into a lens group including the aforementioned cemented lens component and a lens group positioned at the image side of the first-mentioned lens group, and to vary the distance of said lens groups in the movement of the rear lens group for focusing to the short object distance. Such configuration enables satisfactory correction particularly of spherical aberration and coma aberration, thus improving the imaging performance for the short object distance.

An air space at the image side of the cemented lens component in the rear lens group changes with the focusing operation from the infinite object distance to the shortest object distance. More particularly, the rear lens group includes a diaphragm, and the air space between the diaphragm and a lens component adjacent to the diaphragm (the cemented lens component) is varied (reduced) by moving the diaphragm during focusing from the infinite object distance to the shortest object distance.

Furthermore, the wide angle lens of the present invention preferably satisfies the following condition (4):

$$15 < -f_{N2} \cdot v_{N2}/f < 150 \tag{4}$$

wherein f is the focal length of the entire lens system, $f_{N2}$ is the focal length of the negative lens element of the cemented lens component in the rear lens group, and $v_{N2}$ is the Abbe's number of said negative lens element.

This condition (4) defines the suitable glass material to be used in the negative lens element of the cemented lens in the rear lens group.

Outside the range of the condition (4), color correction in the entire lens system becomes unbalanced. Particularly above the upper limit of the condition (4), color aberration is corrected insufficiently in the rear lens group, and color aberration varies significantly in focusing to the short object distance by the movement of the rear lens group. Also spherical aberration for g-line becomes larger, so that image plane curvature for g-line varies considerably depending on the object distance.

Furthermore, the wide angle lens of the present invention is preferably so constructed as to satisfy the following condition (5), defining the optimum thickness range of the negative lens element of the cemented lens component in the front lens group:

$$1.1 < D/D_N < 3.5 \tag{5}$$

wherein $D_N$: thickness of the negative lens element of the cemented lens component in the front lens group;

D: thickness of the cemented lens component in the front lens group.

Above the upper limit of the condition (5), the correction of spherical aberration of higher order becomes undesirably unbalanced. On the other hand, below the lower limit, the positive lens element of the cemented lens component becomes too thin at the edge and difficult to manufacture.

In the present invention, it is preferable that the following condition be satisfied:

$$2.5 < f_P/f < 5.5 \tag{6}$$

wherein $f_P$: the focal length of the convex cemented surface of positive refractive power in the front lens group, f: the focal length of the wide-angle lens system as a whole.

Above the upper limit of the condition (6), spherical aberration generated at the negative meniscus lens component in the front lens group is undesirably over-corrected by the above-mentioned convex cemented surface. On the other hand, below the lower limit of the condition (6), the correction of spherical aberration generated at the negative meniscus lens component, by the above-mentioned cemented convex surface is undesirably insufficient.

Other objects of the present invention, and the features and effects thereof, will become fully apparent from the

DESCRIPTION OF THE PREFERRED EMBODIMENTS

Figure 1:
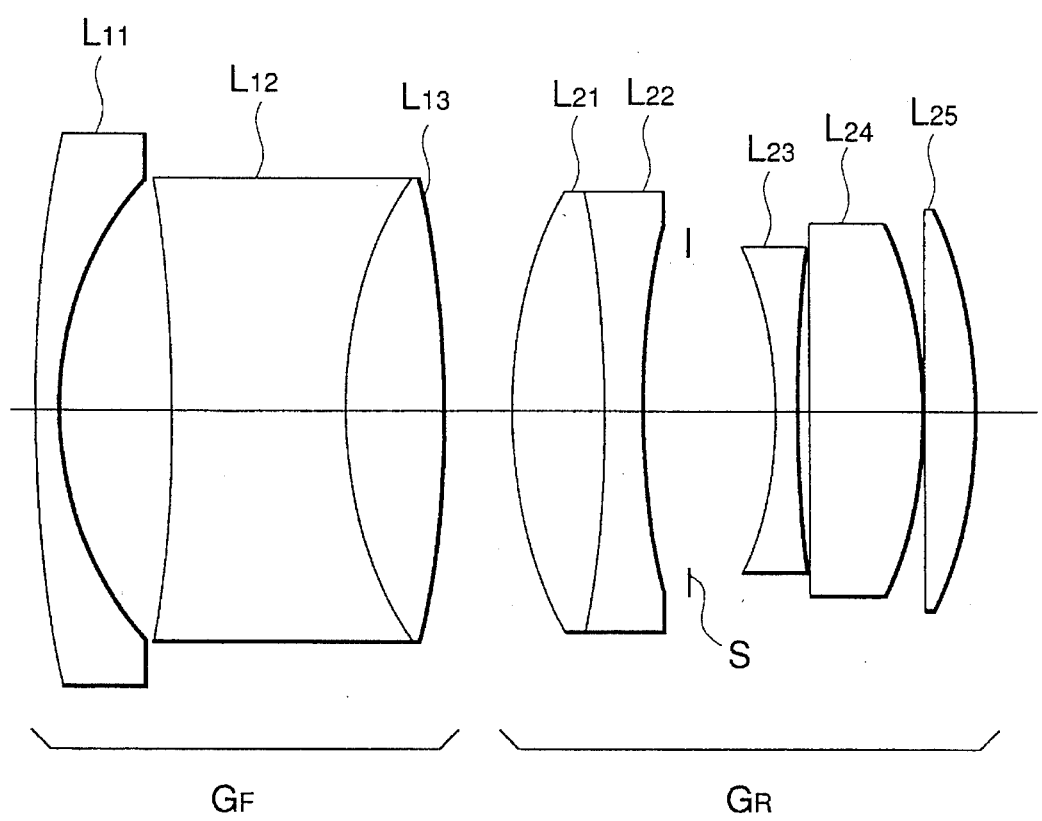
FIG. 1 is a view showing the lens configuration of a first embodiment of the present invention.
Figure 2:
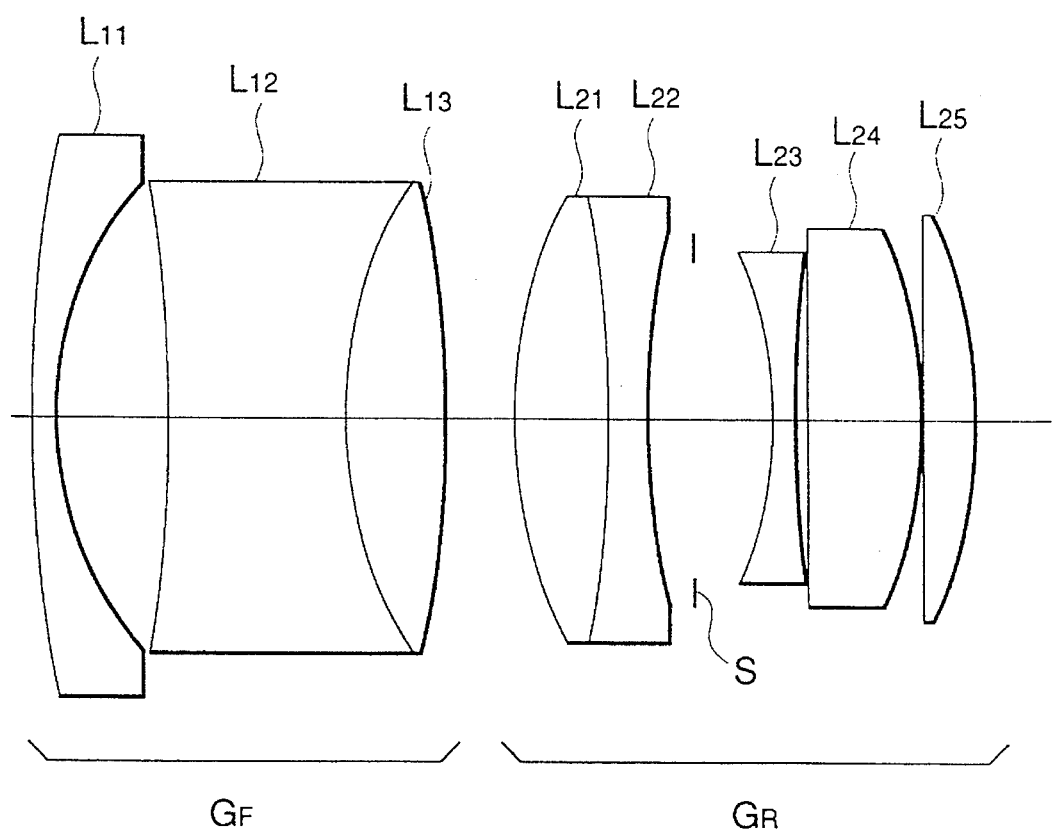
FIG. 2 is a view showing the lens configuration of a second embodiment of the present invention.

Now the present invention will be clarified in greater detail by embodiments shown in the attached drawings. FIGS. 1 and 2 respectively show lens configurations of first and second embodiments of the present invention.

In these drawings, the front lens group $G_F$ has in the order from the object side, a negative meniscus lens $L_{11}$ having a convex surface the object side, and a cemented lens including a negative biconcave lens $L_{12}$ and a positive biconvex lens $L_{13}$. The rear lens group $G_R$ has in the order from the object side, a positive cemented lens including a positive biconvex lens $L_{21}$ and a negative biconcave lens $L_{22}$ (and which, as a whole, is a meniscus shape having a convex surface facing the object side), a diaphragm S, a negative biconcave lens $L_{23}$, a positive biconvex lens $L_{24}$, and a substantially plano-convex positive lens $L_{25}$ having a convex surface the image side. The lens surface of the positive lens $L_{24}$ at the object side is composed of an aspherical face. A reduction in the number of constituent lenses and improvement in the imaging performance are achieved by the above-explained lens configuration.

In these embodiments, in the focusing operation to an object at a short distance, the front lens group $G_F$ is fixed with respect to the image plane, while the rear lens group $G_R$ is advanced toward the object side, thereby reducing the space to the front lens group $G_F$. At the same time, the air space between the negative lens $L_{22}$ and the diaphragm S in the rear lens group $G_R$ is also reduced.

In the following Tables 1 and 2, there are shown the parameters of the first and second embodiments. In these tables, f stands for the focal length, $F_{NO}$ for F-number and $2\omega$ for the image angle. The numbers at the left-hand end indicate the numbers of lens surfaces. Also r stands for the radius of curvature of a lens surface, d for the space between the lens surfaces, and $n_d$ and $v_d$ respectively for the refractive index and Abbe's number for d-line ($\lambda$=587.6 nm).

The asterisked (*) lens surface is an aspherical surface, and r for such aspherical lens surface means the radius of curvature on the optical axis. The shape of the aspherical surface is defined by the following equation:

$$X = (y^2/r)/[1+\{1-k(y/r)^2\}^{1/2}] + C_2 y^2 + C_4 y^4 + C_6 y^6 + C_8 y^8 + C_{10} y^{10}$$

wherein x is the axial displacement, from the top point of the aspherical surface, at a height y from the optical axis on a tangential plane to the top point of the aspherical surface, and $C_2$, $C_4$, $C_6$, $C_8$ and $C_{10}$ are aspherical coefficients.

TABLE 1

[1st embodiment]
f = 35.7 mm, $F_{NO}$ = 1.4, $2\omega$ = 63.4°

| NO. | r | d | $n_d$ | $v_d$ |
|---|---|---|---|---|
| 1 | 132.725 | 2.00 | 1.74400 | 45.06 |
| 2 | 32.475 | 10.30 | | |
| 3 | −115.404 | 16.00 | 1.51823 | 58.96 |
| 4 | 40.129 | 8.00 | 1.84042 | 43.34 |
| 5 | −107.748 | (D5) | | |
| 6 | 39.726 | 9.00 | 1.84042 | 43.34 |
| 7 | −104.146 | 3.44 | 1.75520 | 27.64 |
| 8 | 71.207 | (D8) | | |
| 9 | 0.000 | 8.30 | | |
| 10 | −30.361 | 1.56 | 1.86074 | 23.00 |
| 11 | 142.080 | 1.30 | | |
| *12 | 351.791 | 10.73 | 1.80411 | 46.43 |
| 13 | −39.085 | 0.23 | | |
| 14 | −805.824 | 4.80 | 1.74810 | 52.06 |
| 15 | −41.086 | 38.00 | | |

The variable air spaces for different object distances are as follows. D0 indicates the distance from the object to the first surface of the lens.

| D0 | ∞ | 200.0 |
|---|---|---|
| D5 | 7.20 | 1.14 |
| D8 | 5.03 | 3.75 |

The aspherical constants of the 12th surface are as follows:

$\kappa$=1.36939

$C_2$=0.00

$C_4$=−0.1098501×10$^{-4}$ $C_{C6}$=0.1722887×10$^{-7}$ $C_8$=−0.6410003×10$^{-10}$ $C_{10}$=0.1343541×10$^{-12}$

In the following there are shown numerical values of the present embodiment corresponding to the foregoing conditions:

(1) $f/f_1$=0.008125

(2) $|f_F|/D$=2.4875

(3) $(r_{B-rA})/(r_B+r_A)$=0.2837

(4) $-f_{N2}\cdot v_{N2}/f$=42.99

(5) $D_N/D$=1.5.

TABLE 2

[2nd embodiment]
f = 35.7 mm, $F_{NO}$ = 1.4, $2\omega$ = 63.4°

| NO. | r | d | $n_d$ | $v_d$ |
|---|---|---|---|---|
| 1 | 121.550 | 2.00 | 1.74810 | 52.06 |
| 2 | 32.394 | 10.30 | | |
| 3 | −112.132 | 16.00 | 1.51454 | 54.56 |
| 4 | 40.278 | 8.00 | 1.84042 | 43.34 |
| 5 | −111.346 | (D5) | | |
| 6 | 39.830 | 9.00 | 1.84042 | 43.34 |
| 7 | −100.255 | 3.29 | 1.75520 | 27.64 |
| 8 | 72.445 | (D8) | | |
| 9 | 0.000 | 8.30 | | |
| 10 | −30.564 | 1.40 | 1.86074 | 23.00 |
| 11 | 138.064 | 1.30 | | |
| *12 | 330.741 | 10.60 | 1.80411 | 46.43 |
| 13 | −39.363 | 0.35 | | |
| 14 | −454.597 | 4.80 | 1.80411 | 46.43 |
| 15 | −41.961 | 38.00 | | |

The variable air spaces for different object distances are as follows. D0 indicates the distance from the object to the first surface of the lens.

| D0 | ∞ | 200 |
|---|---|---|
| D5 | 7.20 | 1.12 |
| D8 | 4.95 | 3.61 |

The aspherical constants of the 12th surface are as follows.

$\kappa = 0.59435$ $C_2 = 0.00$ $C_4 = -0.1088217 \times 10^{-4}$ $C_6 = 0.1722685 \times 10^{-7}$ $C_8 = -0.6285167 \times 10^{-10}$ $C_{10} = 0.1329922 \times 10^{-12}$ In the following there are shown numerical values of the present embodiment corresponding to the foregoing conditions:

(1) $f/f_1 = 0.004103$ (2) $|f_F|/D = 2.4288$ (3) $(r_B - r_A)/(r_B + r_A) = 0.2905$ (4) $-f_{N2} \cdot v_{N2}/f = 42.77$ (5) $D_N/D = 1.5$ The 1st and 2nd embodiments of the present invention maintain excellent imaging performance from the infinite object distance to the short object distance, despite an F-number as low as 1.4 and a limited number of constituent lenses as few as 8 lenses constituting 6 groups.

Figure 3:
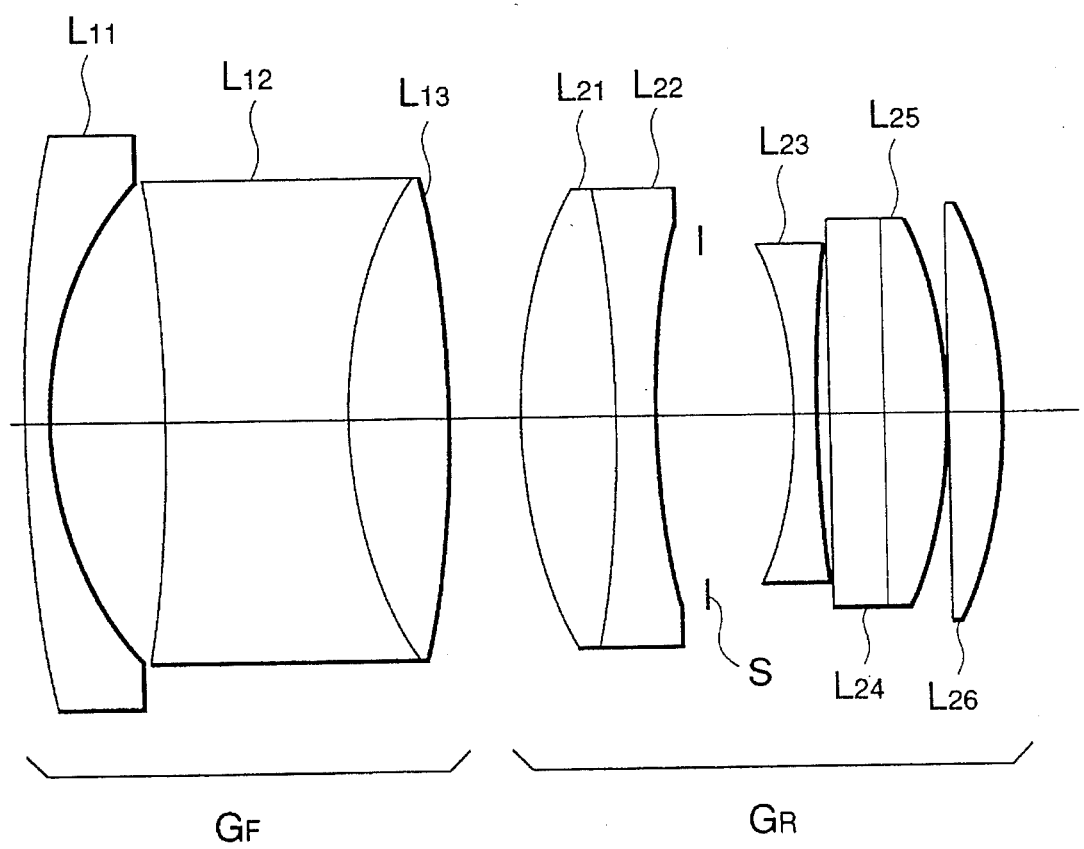
FIG. 3 is a view showing the lens configuration of a third embodiment of the present invention.

In the following there will be explained a 3rd embodiment of the present invention, with reference to FIG. 3 showing the lens configuration thereof.

In this 3rd embodiment, as shown in FIG. 3, the front lens group $G_F$ is constructed similarly to that in the 1st and 2nd embodiments. The rear lens group GR includes in the order from the object side, a positive cemented lens having a positive biconvex lens $L_{21}$ and a negative biconcave lens $L_{22}$, a diaphragm S, a negative biconcave lens $L_{23}$, a positive plano-convex lens $L_{24}$, and a positive plano-convex lens $L_{25}$, and a substantially plano-convex positive lens $L_{26}$ having a convex surface facing the image side, wherein the lens surface of the positive lens $L_{24}$ at the object side is composed of an aspherical face, thereby achieving a reduction in the number of constituent lenses and improvement in the imaging performance.

Also in the present embodiment, in the focusing operation to an object at a short distance, the front lens group $G_F$ remains fixed with respect to the image plane, while the rear lens group $G_R$ is advanced toward the object side, thereby reducing the space to the front lens group $G_F$. At the same time the air space between the negative lens $L_{22}$ and the diaphragm S in the rear lens group $G_R$ is also reduced.

In the following Table 3 there are shown the parameters of the 3rd embodiment. In this table, f stands for the focal length, $F_{NO}$ for F-number and 2ω for the image angle. The numbers at the left-hand end indicate the numbers of the lens surfaces. Also r stands for the radius of curvature of a lens surface, d for the space between the lens surfaces, and $n_d$ and $v_d$ respectively for the refractive index and Abbe's number for d-line (λ=587.6 nm). The asterisked (*) lens surface is an aspherical surface, and r for such aspherical lens surface means the radius of curvature on the optical axis. The shape of the aspherical surface is defined by the equation explained before in the 1st and 2nd embodiments.

TABLE 3

[3rd embodiment]
f = 35.7 mm, $F_{NO}$ = 1.4, 2 ω = 63.4°

| NO. | r | d | $n_d$ | $v_d$ |
|---|---|---|---|---|
| 1 | 132.199 | 2.00 | 1.74400 | 45.06 |
| 2 | 32.510 | 10.30 | | |
| 3 | −114.718 | 16.00 | 1.51823 | 58.96 |
| 4 | 40.210 | 8.00 | 1.84042 | 43.34 |
| 5 | −106.995 | (D5) | | |
| 6 | 39.599 | 9.00 | 1.84042 | 43.34 |
| 7 | −105.353 | 3.39 | 1.75520 | 27.64 |
| 8 | 70.654 | (D8) | | |
| 9 | 0.000 | 8.30 | | |
| 10 | −30.426 | 1.60 | 1.86074 | 23.00 |
| 11 | 144.336 | 1.30 | | |
| *12 | 357.224 | 5.00 | 1.74443 | 49.53 |
| 13 | 0.000 | 5.70 | 1.80411 | 46.54 |
| 14 | −38.981 | 0.20 | | |
| 15 | −789.417 | 4.80 | 1.74810 | 52.30 |
| 16 | −41.185 | 38.00 | | |

The variable air spaces for different object distances are as follows. D0 indicates the distance from the object to the first surface of the lens.

| D0 | ∞ | 200 |
|---|---|---|
| D5 | 7.20 | 1.17 |
| D8 | 4.99 | 3.70 |

The aspherical constants of the 12th surface are as follows:

$\kappa = 1.10445$ $C_2 = 0.00$ $C_4 = -0.1185075 \times 10^{-4}$ $C_6 = 0.1185075 \times 10^{-7}$ $C_8 = -0.6612884 \times 10^{-10}$ $C_{10} = 0.1407119 \times 10^{-12}$ In the following there are shown numerical values of the present embodiment corresponding to the foregoing conditions:

(1) $f/f_1 = 0.010432$ (2) $|f_F|/D = 2.4838$ (3) $(r_B - r_A)/(r_B + r_A) = 0.2817$ (4) $-f_{N2} \cdot v_{N2}/f = 42.77$ (5) $D_N/D = 1.5$ The 3rd embodiment of the present invention maintains excellent imaging performance from the infinite object distance to the short object distance, despite an F-number as low as 1.4 and a limited number of constituent lenses as few as 9 lenses constituting 6 groups.

Figure 4:
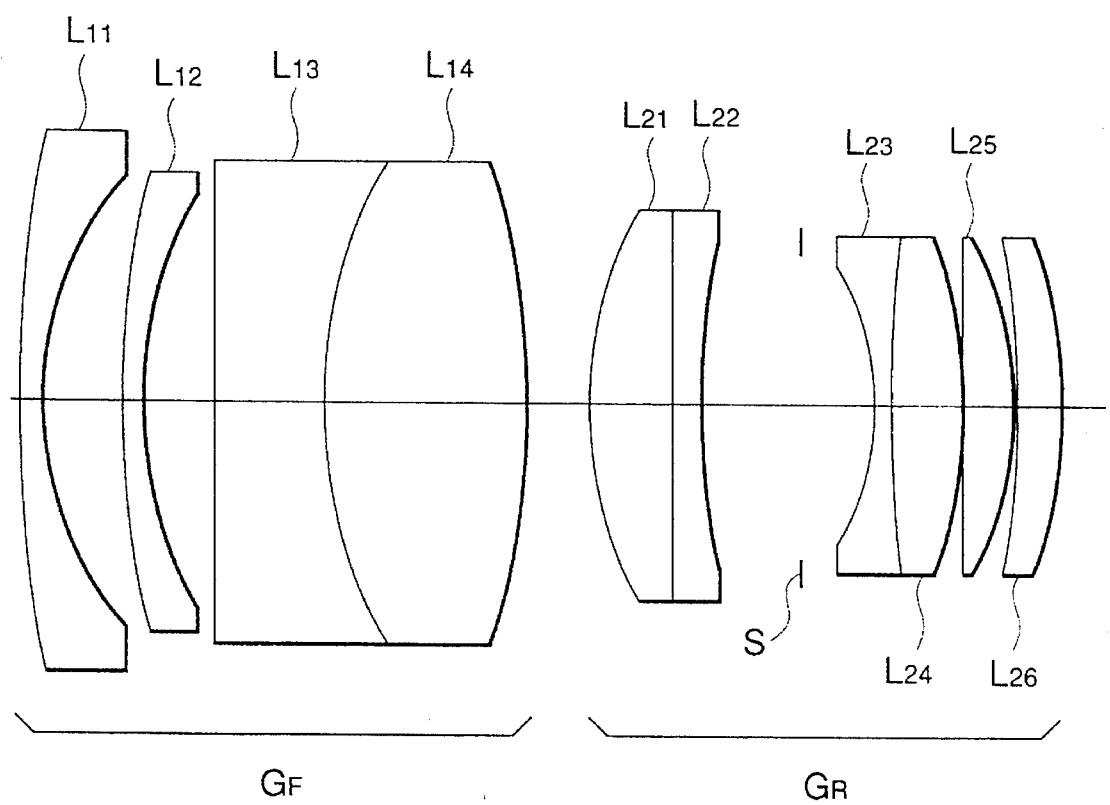
FIG. 4 is a view showing the lens configuration of a fourth embodiment of the present invention.

In the following there will be explained a 4th embodiment of the present invention, with reference to FIG. 4 showing the lens configuration thereof.

In this 4th embodiment, as shown in the FIG. 4, the front lens group GF includes, in the order from the object side, a negative meniscus lens L11 having a convex surface facing the object side, a negative meniscus lens $L_{12}$ having a convex surface facing the object side, and a positive cemented lens having a negative biconcave lens $L_{13}$ and a positive biconvex lens $L_{14}$.

The rear lens group GR includes, in the order from the object side, a positive cemented lens having a positive biconvex lens $L_{21}$ and a negative biconcave lens $L_{22}$, a negative cemented lens having a negative biconcave lens $L_{23}$ and a positive biconvex lens $L_{24}$, a substantially plano-convex positive lens $L_{25}$ having a convex surface facing the image side, and a positive meniscus lens $L_{26}$ having a convex surface facing the image side, wherein the lens surface of the positive lens $L_{25}$ at the object side is composed of an aspherical face, thereby achieving a reduction in the number of constituent lenses and improvement in the imaging performance.

Also in this embodiment, in the focusing operation to an object of a short distance, the front lens group $G_F$ remains fixed with respect to the image plane, while the rear lens group $G_R$ advances toward the object side, thereby reducing the space to the front lens group $G_F$. At the same time, the air space between the negative lens $L_{22}$ and the diaphragm S in the rear lens group $G_R$ is also reduced.

In the following Table 4 there are shown the parameters of the 4th embodiment. In this table, f stands for the focal length, $F_{NO}$ for the F-number and $2\omega$ for the image angle. The numbers at the left-hand end indicate the numbers of the lens surfaces. Also r stands for the radius of curvature of a lens surface, d for the space between the lens surfaces, and $n_d$ and $v_d$ respectively for the refractive index and Abbe's number for d-line ($\lambda$=587.6 nm). The asterisked (*) lens surface is an aspherical surface, and r for such aspherical lens face means the radius of curvature on the optical axis. The shape of the aspherical surface is defined by the equation explained before in the 1st and 2nd embodiments.

TABLE 4

[4th embodiment]
f = 28.6 mm, $F_{NO}$ = 1.4, $2\omega$ = 75.8°

| NO. | r | d | $n_d$ | $v_d$ |
|---|---|---|---|---|
| 1 | 103.917 | 2.00 | 1.84042 | 43.30 |
| 2 | 33.072 | 7.80 | | |
| 3 | 96.036 | 2.00 | 1.84042 | 43.34 |
| 4 | 43.058 | 7.30 | | |
| 5 | −350.144 | 9.31 | 1.51680 | 64.12 |
| 6 | 39.746 | 20.00 | 1.84042 | 43.34 |
| 7 | −71.040 | (D7) | | |
| 8 | 36.861 | 7.50 | 1.80218 | 44.69 |
| 9 | −482.972 | 2.00 | 1.79504 | 28.56 |
| 10 | 53.290 | (D10) | | |
| 11 | 0.000 | 8.42 | | |
| 12 | −25.253 | 2.00 | 1.86074 | 23.00 |
| 13 | 550.000 | 6.30 | 1.84042 | 43.30 |
| 14 | −67.714 | 0.60 | | |
| *15 | −7898.920 | 4.50 | 1.77279 | 49.44 |
| 16 | −36.533 | 0.20 | | |
| 17 | −108.899 | 4.50 | 1.74810 | 52.06 |
| 18 | −41.522 | 38.00 | | |

The variable air spaces for different object distances are as follows. D0 indicates the distance from the object to the first surface of the lens.

| D0 | ∞ | 200 |
|---|---|---|
| D7 | 7.00 | 4.09 |
| D10 | 9.68 | 7.95 | the aspherical constants for the 15th surface are as follows:

$\kappa$=0.79463
$C_2$=0.00
$C_4$=−0.8365531×10$^{-5}$
$C_6$=0.00
$C_8$=0.795680×10$^{-11}$
$C_{10}$=0.00

In the following there are shown numerical values of the present embodiment, corresponding to the foregoing conditions:

(1) $f/f_1$=0.05196

(2) $|f_F|/D$=1.1621

(3) $(r_B-r_A)/(r_B+r_A)$=0.1822

(4) $-f_{N2} \cdot v_{N2}/f$=60.19

(5) $D_N/D$−3.148

The 4th embodiment of the present invention maintains excellent imaging performance from the infinite object distance to the short object distance, despite an F-number as low as 1.4, an image angle as wide as 75° and a limited number of constituent lenses as few as 10 lenses constituting 7 groups.

As explained in the foregoing, the embodiments of the present invention can provide a wide angle lens attaining satisfactory imaging performance from the infinite object distance to the short object distance despite of a low F-number and a simple lens configuration.

The foregoing embodiments have only been given for clarifying the technical concept of the present invention. It is to be understood that the present invention is by no means limited by such embodiments but is subject to various modifications within the scope and spirit of the appended claims.

What is claimed is:

1. A wide angle lens system comprising:

a front lens group; and a rear lens group having positive refractive power;

said front lens group including, in the order from the object side, a negative meniscus lens component having a convex surface facing the object side, and a cemented lens component having a negative lens element, a positive lens element and a convex cemented surface with positive refractive power facing the object side, said rear lens group including, a cemented lens component having a positive lens element, a negative lens element and a convex surface facing the object side, wherein the distance between said front lens group and said rear lens group decreases during focusing operation from the infinite object distance toward the shortest object distance.

2. A wide angle lens system according to claim 1, further satisfying the condition:

$$0 \leq f/f_1 < 0.13$$

wherein f is the focal length of the entire lens system and $f_1$ is the focal length of said front lens group.

3. A wide angel lens system according to claim 1, further satisfying the condition:

$$0.1 < |f_F|/D < 4$$

wherein $f_F$ is the synthesized focal length of lenses positioned at the object side of said cemented lens component in said front lens group, and D is the thickness of said cemented lens component in said front lens group.

4. A wide angle lens system according to claim 1, wherein said rear lens group includes at least an aspherical surface.

5. A wide angle lens system according to claim 1, further satisfying the following condition:

$$0.1 < (r_B - r_A)/(r_B + r_A) < 1.0$$

wherein $r_A$ is the radius of curvature of the lens surface closest to the object side in said cemented lens component of said rear lens group, and $r_B$ is the radius of curvature of lens surface closest to the image side in said cemented lens component of said rear lens group.

6. A wide angle lens system according to claim 1, wherein said rear lens group includes a diaphragm, an air space between the diaphragm and a lens component adjacent to said diaphragm being varied, for focusing operation from the infinite object distance to the shortest object distance.

7. A wide angle lens system according to claim 1, further satisfying the condition:

$$15 < -f_{N2} \cdot v_{N2}/f < 150$$

wherein f is the focal length of the entire lens system, and $f_{N2}$ and $v_{N2}$ are respectively the focal length and the Abbe's number of said negative lens element in said cemented lens component of said rear lens group.

8. A wide angle lens system according to claim 1, further satisfying the condition:

$$1.1 < D/D_N < 3.5$$

wherein $D_N$ is the thickness of the negative lens element in said cemented lens component of said front lens group, and D is the thickness of said cemented lens component of said front lens group.

9. A wide angle lens system according to claim 1, wherein said cemented lens component in said front lens group includes, in the order from the object side, said negative lens element and said positive lens element.

10. A wide angle lens system according to claim 1, wherein said cemented lens component in said rear lens group is, as a whole, a meniscus shape having said convex surface facing the object side.

11. A wide angle lens system according to claim 1, wherein said cemented lens component in said rear lens group includes, in the order from the object side, said positive lens element and said negative lens element.

12. A wide angle lens system according to claim 1, wherein an air space in the image side of said cemented lens component in said rear lens group changes with the focusing operation from the infinite distance object to the shortest object distance.

13. A wide angle lens system according to claim 1, further satisfying the condition:

$$2.5 < f_p/f < 5.5$$

wherein f is the focal length of said wide angle lens system, and $f_p$ is the focal length of said cemented surface with positive refractive power in said front lens group.

14. A wide angle lens system according to claim 1, wherein said rear lens group is moved toward the object side for said focusing operation from the infinite object distance toward the shortest object distance.

15. A wide angle lens system comprising:

a front lens group; and a rear lens group having positive refractive power;

said front lens group including, in the order from the object side, a negative meniscus lens component having a convex surface facing the object side, and a cemented lens component having a negative lens element, a positive lens element and a convex cemented surface with positive refractive power facing the object side, said rear lens group including, a cemented lens component having a positive lens element, a negative lens element and a convex surface facing the object side, wherein said rear lens group is moved toward the object side for focusing operation from the infinite object distance toward the shortest object distance, and said wide angle lens system further satisfies conditions:

$$0 \leq f/f_1 < 0.13$$

$$0.1 < |f_F|/D < 4$$

wherein f is the focal length of said wide angle lens system, $f_1$ is the focal length of said front lens group, $f_F$ is the synthesized focal length of lenses positioned toward the object side of said cemented lens component in said front lens group, and D is the thickness of said cemented lens component in said front lens group.

16. A wide angle lens system according to claim 15, wherein an air space in the image side of said cemented lens component in said rear lens group changes with the focusing operation from the infinite object distance to the shortest object distance.

17. A wide angle lens system according to claim 15, wherein said rear lens group includes at least an aspherical surface.

18. A wide angle lens system according to claim 15, further satisfying the condition:

$$2.5 < f_p/f < 5.5$$

wherein f is the focal length of said wide angle lens system, and $f_p$ is the focal length of said cemented surface with positive refractive power in said front lens group.

* * * * *